(12) United States Patent
Takahashi et al.

(10) Patent No.: US 9,114,527 B2
(45) Date of Patent: Aug. 25, 2015

(54) ROBOT

(71) Applicant: KABUSHIKI KAISHA YASKAWA DENKI, Kitakyushu-shi (JP)

(72) Inventors: Shingi Takahashi, Fukuoka (JP); Takuya Okada, Fukuoka (JP); Tomoyuki Shiraki, Fukuoka (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 2 days.

(21) Appl. No.: 14/067,965

(22) Filed: Oct. 31, 2013

(65) Prior Publication Data
US 2014/0360307 A1 Dec. 11, 2014

(30) Foreign Application Priority Data
Jun. 10, 2013 (JP) ................................. 2013-122092

(51) Int. Cl.
*B25J 9/10* (2006.01)
*B25J 17/02* (2006.01)
*F16H 55/18* (2006.01)

(52) U.S. Cl.
CPC ...... *B25J 9/103* (2013.01); *B25J 17/02* (2013.01); *F16H 55/18* (2013.01); *Y10S 901/25* (2013.01); *Y10T 74/20329* (2015.01)

(58) Field of Classification Search
CPC ..... B25J 17/02; B25J 9/103; F16H 2057/126; F16H 2057/127; F16H 57/12; F16H 55/18; F16H 55/24
USPC .............. 74/490.01, 490.03, 490.05, 490.06, 74/411, 412 R, 421 A, 421 R, 409; 901/15, 901/27–29
See application file for complete search history.

(56) References Cited

U.S. PATENT DOCUMENTS

| | | | | |
|---|---|---|---|---|
| 3,365,973 A | * | 1/1968 | Henden | 74/409 |
| 4,630,496 A | * | 12/1986 | Yasuoka | 74/409 |
| 4,811,615 A | * | 3/1989 | Rea | 74/375 |
| 4,920,828 A | * | 5/1990 | Kameda et al. | 475/299 |
| 6,661,986 B2 | * | 12/2003 | Kitayama | 399/167 |
| 2005/0115348 A1 | * | 6/2005 | Fisher | 74/425 |

(Continued)

FOREIGN PATENT DOCUMENTS

| | | | | |
|---|---|---|---|---|
| DE | 102012025210 A1 | * | 3/2014 | .............. F16H 55/18 |
| JP | 06042610 A | * | 2/1994 | .............. F16H 55/18 |

(Continued)

OTHER PUBLICATIONS

Japanese Office Action for corresponding JP Application No. 2013-122092, May 12, 2015.

*Primary Examiner* — William Kelleher
*Assistant Examiner* — Bobby Rushing, Jr.
(74) *Attorney, Agent, or Firm* — Mori & Ward, LLP

(57) ABSTRACT

A robot according to embodiments includes a first link, a second link, an actuator, a scissors gear, and a support part. The second link is rotatably connected to the first link. The actuator drives the second link in a rotatable manner. The scissors gear includes a main gear and a sub gear, and outputs driving force from the actuator to the second link. The support part is attached to the first link and rotatably supports the scissors gear. Furthermore, the scissors gear includes a spring that is arranged adjacent to the support part in the direction of the rotational axis of the scissors gear and applies biasing force to the main gear and the sub gear in rotational directions different from each other.

15 Claims, 12 Drawing Sheets

(56) References Cited

U.S. PATENT DOCUMENTS

| | | |
|---|---|---|
| 2007/0137370 A1 | 6/2007 | Ichibangase et al. |
| 2009/0095103 A1 | 4/2009 | Duzzie et al. |
| 2009/0114047 A1* | 5/2009 | Davenne et al. ................. 74/411 |
| 2009/0146650 A1* | 6/2009 | Hatanaka et al. ......... 324/207.25 |
| 2013/0228029 A1* | 9/2013 | Murphy et al. ................. 74/443 |

FOREIGN PATENT DOCUMENTS

| | | |
|---|---|---|
| JP | 6-32813 U | 4/1994 |
| JP | 2001-74126 A | 3/2001 |
| JP | 4529456 B2 | 7/2005 |
| JP | 2008-073775 | 4/2008 |
| JP | 2010-76024 A | 4/2010 |

* cited by examiner

ROBOT

CROSS-REFERENCE TO RELATED APPLICATION

This application is based upon and claims the benefit of priority from the prior Japanese Patent Application No. 2013-122092, filed on Jun. 10, 2013, the entire contents of which are incorporated by reference.

FIELD

The embodiments discussed herein are directed to a robot.

BACKGROUND

Conventionally, there has been proposed an industrial robot that includes a plurality of links rotatably connected to each other and capable of performing a predetermined operation with the use of an end effector (arc welding torch or the like) attached to the distal end of an arm of the robot while driving the link in a rotatable manner by using an actuator (see Japanese Patent No. 4529456, for example).

In the above-mentioned robot, the actuator and the link are connected to each other by way of a power transmission mechanism including a gear or the like, and the driving force of the actuator is transmitted to the link by way of the power transmission mechanism. Furthermore, in the above-mentioned robot, a scissors gear is used as a gear to eliminate backlash thereby. Here, the scissors gear is, for example, constituted of two gears stacked on each other in place of one gear generally used and a spring that applies a biasing force to the gears in the rotational directions different from each other.

However, in the above-mentioned robot, there has been the possibility that the increase in size of the scissors gear causes the increase of the occupation space of the power transmission mechanism. To be more specific, in the scissors gear in the above-mentioned robot, housing grooves are respectively formed in the overlapping surfaces of the gears overlapping each other, and a spring is housed in the housing grooves.

That is, in the scissors gear, the spring and the housing grooves are arranged in a space between the bottom of a tooth and the center of a rotational axis of each gear; that is, at a position spaced apart from the bottom of the tooth of each gear in the direction perpendicular to the rotational axis of each gear (in the diameter direction). Therefore, there has been the possibility that the above-mentioned scissors gear is increased in size by an amount of the space for the spring and the housing groove and the occupation space of the power transmission mechanism is increased.

Actually, the larger the occupation space of the power transmission mechanism is, the larger the robot as a whole becomes. As a result, for example, when the robot performs a predetermined work, there gives rise to a possibility that the robot interferes with an object to be worked (workpiece). Accordingly, it has been desired to miniaturize the scissors gear to reduce the occupation space of the power transmission mechanism including the scissors gear.

SUMMARY

A robot according to embodiments includes a first link, a second link, an actuator, a scissors gear, and a support part. The second link is rotatably connected to the first link. The actuator drives the second link in a rotatable manner. The scissors gear includes a main gear and a sub gear, and outputs driving force from the actuator to the second link. The support part is attached to the first link and rotatably supports the scissors gear. Furthermore, the scissors gear includes a spring that is arranged adjacent to the support part in a direction of a rotational axis of the scissors gear and applies biasing force to the main gear and the sub gear in rotational directions different from each other.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein:

FIG. 6 is an enlarged perspective view illustrating a scissors gear taken out from the view in FIG. 3 or the like.

DESCRIPTION OF EMBODIMENTS

First of all, a first embodiment is explained.

Figure 1:
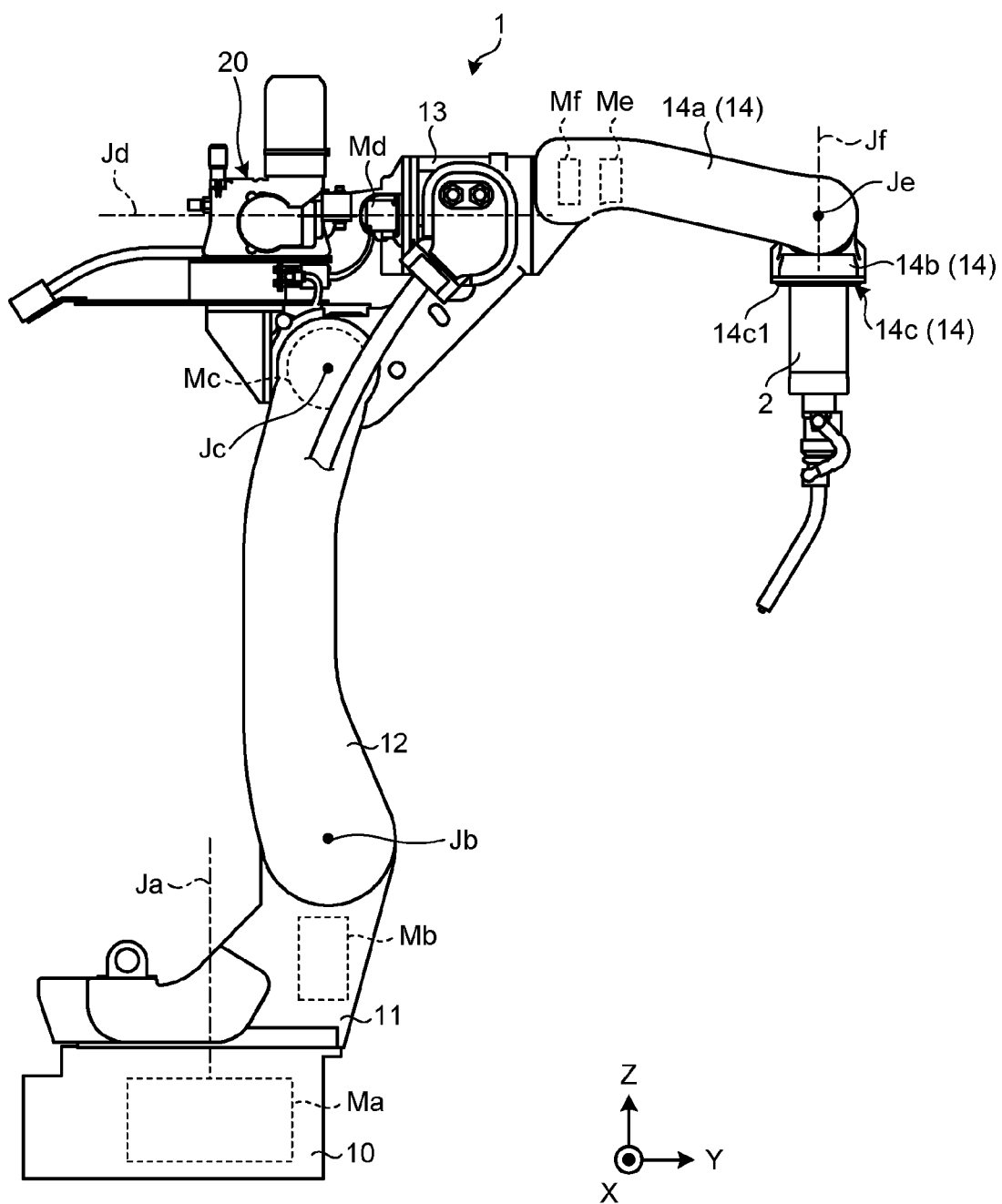
FIG. 1 is a side view illustrating a robot according to a first embodiment.

FIG. 1 is a side view illustrating a robot according to the first embodiment. Here, for convenience of explanation, in FIG. 1, the three-dimensional orthogonal coordinate system is illustrated, wherein a Z-axis is indicated such that the vertical upward direction and the vertical downward direction of the coordinate system correspond to the positive direction and the negative direction respectively, a Y-axis is indicated as the lateral direction on the paper, and an X-axis is indicated as the direction perpendicular to the paper. The orthogonal coordinate system is also indicated in the other drawings used for the explanations made later in some cases.

Furthermore, hereinafter, the constitution of the robot is explained by expressing the direction as "X-axis direction", "Y-axis direction", "Z-axis direction", or the like. However, each of these directions means the X-axis direction, the Y-axis direction, or the Z-axis direction when the robot is in a posture illustrated in the drawing, and each direction is not limited to the direction expressed in the explanation.

As illustrated in FIG. 1, a robot 1 is an industrial robot for arc welding, the robot including, for example, a torch 2 for arc welding that is attached to the distal end of a wrist portion thereof as an end effector. Furthermore, the robot 1 is an articulated robot having a plurality of links, a plurality of rotational axes (articulated axes) Ja to Jf for connecting each of the links. The robot 1 includes, as links, a base 10, a swivel 11, a lower arm 12, an upper arm 13, and a wrist portion 14 having first to third wrists 14a, 14b, and 14c that are rotatably connected to each other.

To be more specific, the swivel 11 is connected to the base 10 in a rotatable manner about the rotational axis Ja, and the lower arm 12 is connected to the swivel 11 in a rotatable manner about the rotational axis Jb perpendicular to the rotational axis Ja. Furthermore, the upper arm 13 is connected to the lower arm 12 in a rotatable manner about the rotational axis Jc parallel to the rotational axis Jb, and the first wrist 14a is connected to the upper arm 13 in a rotatable manner about the rotational axis Jd perpendicular to the rotational axis Jc.

The second wrist (first link) 14b is connected to the first wrist 14a in a rotatable manner about the rotational axis Je perpendicular to the rotational axis Jd, and the third wrist (second link) 14c is connected to the second wrist 14b in a rotatable manner about the rotational axis Jf perpendicular to the rotational axis Je. The above-mentioned third wrist 14c corresponds to link means.

Here, with respect to the above-mentioned words such as "perpendicular" or "parallel", or the after-mentioned word such as "horizontal", mathematically strict accuracy is not necessarily required, and substantial tolerances or errors are allowed. Furthermore, in this specification, the word of "perpendicular" means not only that two straight lines (rotational axes) are perpendicular to each other in the same plane but also that two lines (rotational axes) are arranged so as to be skew.

The robot 1 includes actuators Ma to Mf for driving the above-mentioned swivel 11, lower arm 12, upper arm 13, first to third wrists 14a, 14b, and 14c in a rotatable manner. Each of the actuators Ma to Mf is, to be more specific, a servo motor or the like.

Here, although a servo motor is used as each of the above-mentioned actuators Ma to Mf, the actuator is not limited to the servo motor. For example, the other kinds of motors such as hydraulic motors may be used. Furthermore, hereinafter, the actuator is expressed as "motor".

Each of the motors Ma to Mf is explained. The motor Ma mounted on the base 10 is connected to the swivel 11 to drive the swivel 11 in a rotatable manner. The motor Mb mounted on the swivel 11 is connected to the lower arm 12 to drive the lower arm 12 in a rotatable manner, and the motor Mc mounted on the lower arm 12 is connected to the upper arm 13 to drive the upper arm 13 in a rotatable manner. Furthermore, the motor Md mounted on the upper arm 13 is connected to the wrist portion 14, and correctly to the first wrist 14a to drive the first wrist 14a of the wrist portion 14 in a rotatable manner.

Both of the motor Me and the motor Mf are mounted on the first wrist 14a. The motor Me is connected to the second wrist 14b by way of a power transmission mechanism (not illustrated in the drawings) including a pulley, a gear, and the like for transmitting the driving force of the motor Me to the second wrist 14b to drive the second wrist 14b in a rotatable manner.

The motor Mf is connected to the third wrist 14c by way of a power transmission mechanism (not illustrated in FIG. 1) including a pulley, a gear, and the like for transmitting the driving force of the motor Mf to the third wrist 14c to drive the third wrist 14c in a rotatable manner. The above-mentioned motor Mf corresponds to output means for outputting driving force for rotating the link means.

Here, in the robot 1, as a gear for transmitting the driving force of the motor Mf to the third wrist 14c, for example, a scissors gear or the like is used. The constitution of a power transmission mechanism including the scissors gear is specifically explained later.

The third wrist 14c includes a wrist flange 14c1 to which the above-mentioned torch 2 is attached.

Each of the above-mentioned motors Ma to Mf inputs therein a signal indicating an operation instruction from a controller that is not illustrated in the drawings and is controlled based on the signal. Furthermore, the robot 1 controls the operation of each of the motors Ma to Mf to perform predetermined works with the use of an end effector. To be more specific, for example, while changing the position or the angle of the torch 2, the robot 1 approximates the torch 2 to an object to be welded to perform arc welding by an arc generated from the torch 2.

In addition, the robot 1 includes a feeder 20. The feeder 20 feeds a torch wire (not illustrated in the drawings) that is a filler material for the arc welding to the torch 2. The feeder 20 is, for example, arranged on the rear side of the upper arm 13 (negative side in the Y-axis direction) and the upper side of the lower arm 12 in the perpendicular direction (positive side in the Z-axis direction).

Actually, in the above-mentioned robot that performs an operation such as arc welding, conventionally, it has been desired to reduce the occupation space of a power transmission mechanism that connects a motor and a link (third wrist, for example).

To explain specifically, there may be a case that the power transmission mechanism is constituted of a gear or the like and a scissors gear capable of reducing a backlash is, for example, used as the gear. The scissors gear includes a main gear, a sub gear, and a spring that applies biasing force to the main gear and the sub gear in the rotational directions different from each other. There has been the possibility that the use of the spring causes the increase in size of the scissors gear.

To be more specific, for example, when the spring or a housing groove is arranged in each of overlapping surfaces of the main gear and the sub gear that overlap each other, there has been the possibility that the scissors gear is increased in size by an amount of the space for the spring and the housing groove in the diameter direction and the occupation space of the power transmission mechanism is also increased. Here, the increase in size of the scissors gear may be caused irrespective of whether each of the main gear and the sub gear is an external gear or an internal gear.

Furthermore, the larger the occupation space of the power transmission mechanism is, the larger the robot as a whole becomes. As a result, for example, when the robot performs a predetermined work, there gives rise to a possibility that the robot interferes with an object to be worked, or the like. Accordingly, it has been desired to miniaturize the scissors gear to reduce the occupation space of the power transmission mechanism including the scissors gear as much as possible.

Consequently, the robot 1 according to the present embodiment adopts the constitution capable of reducing the occupation space of the power transmission mechanism that connects a motor and a link; to be more specific, the motor Mf and the third wrist 14c. Hereinafter, the constitution of the power transmission mechanism is explained in detail.

Figure 2:
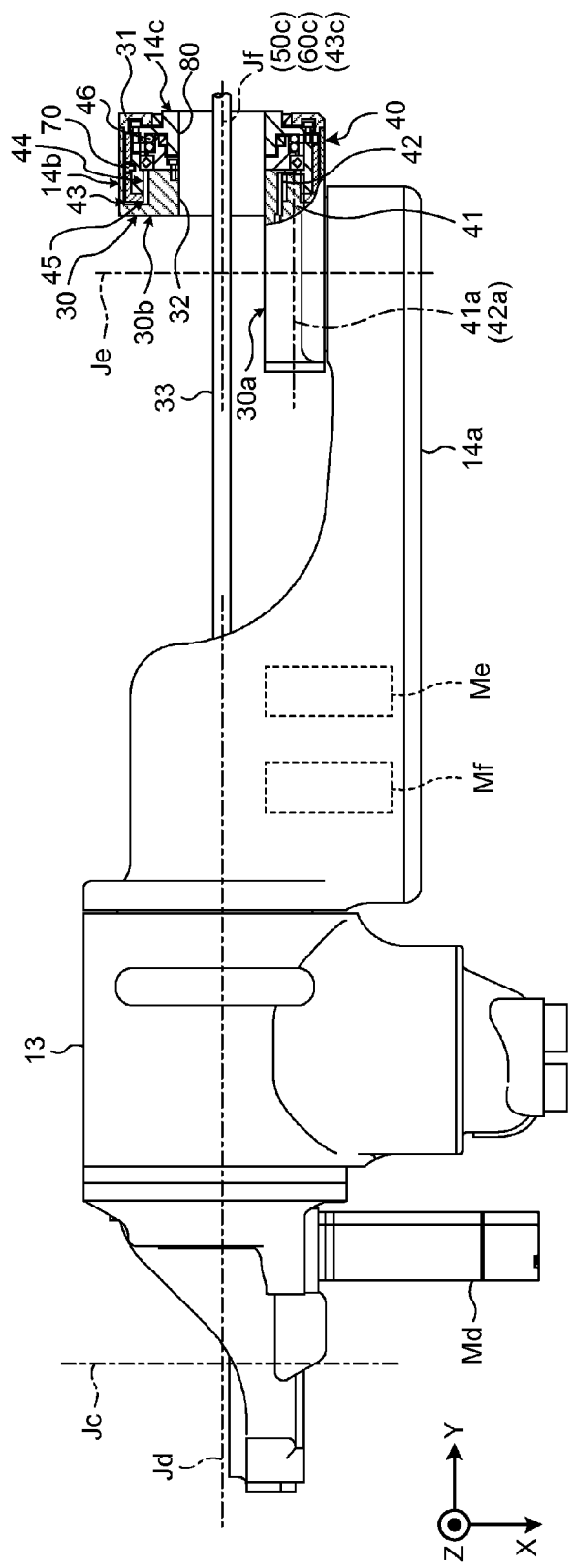
FIG. 2 is a partially cross-sectioned plan view illustrating only a part in the vicinity of an upper arm and first to third wrists that are illustrated in FIG. 1.
Figure 3:
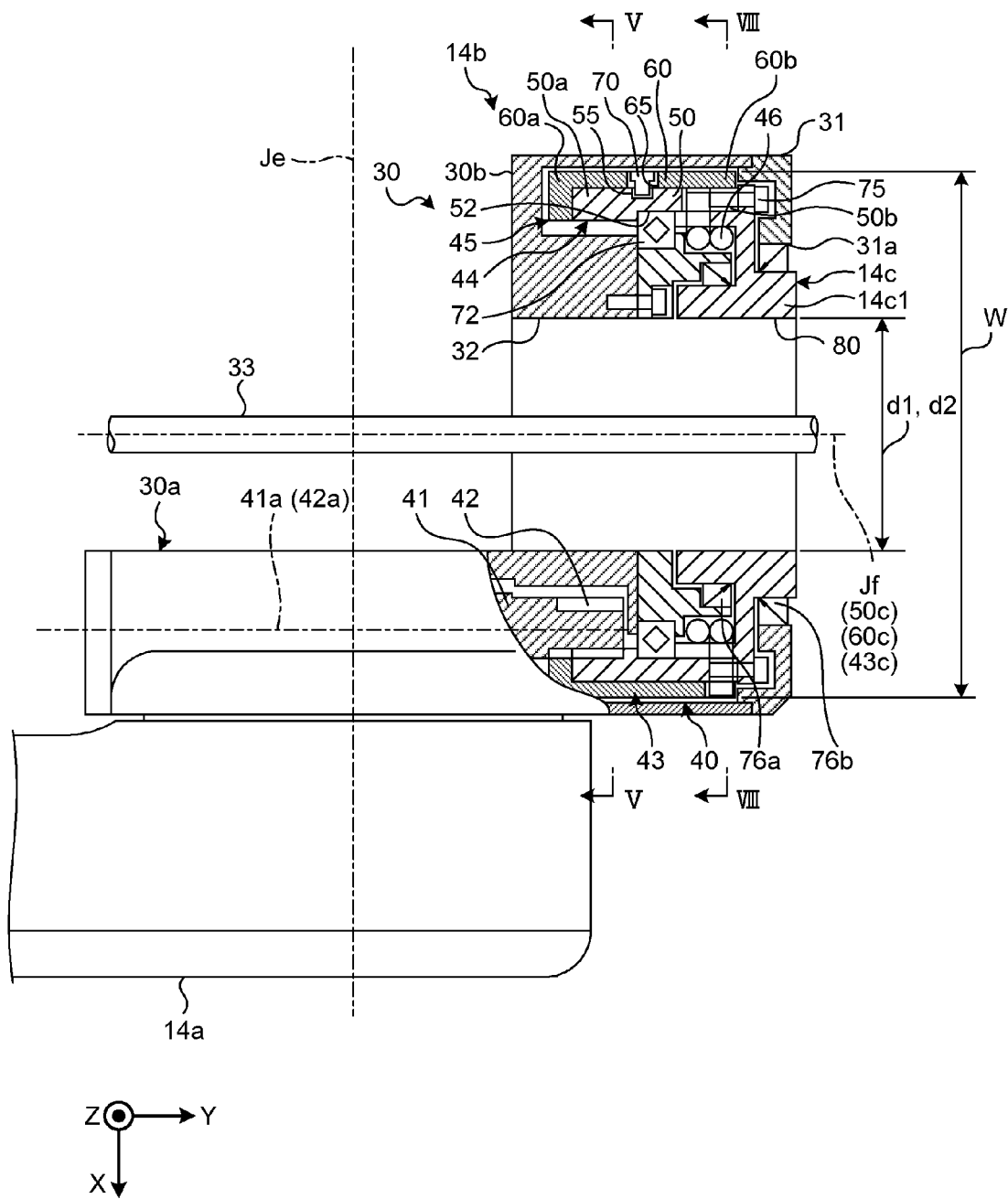
FIG. 3 is an enlarged partially-sectional plan view illustrating a part in the vicinity of the second and third wrists illustrated in FIG. 2 in an enlarged manner.
Figure 4:
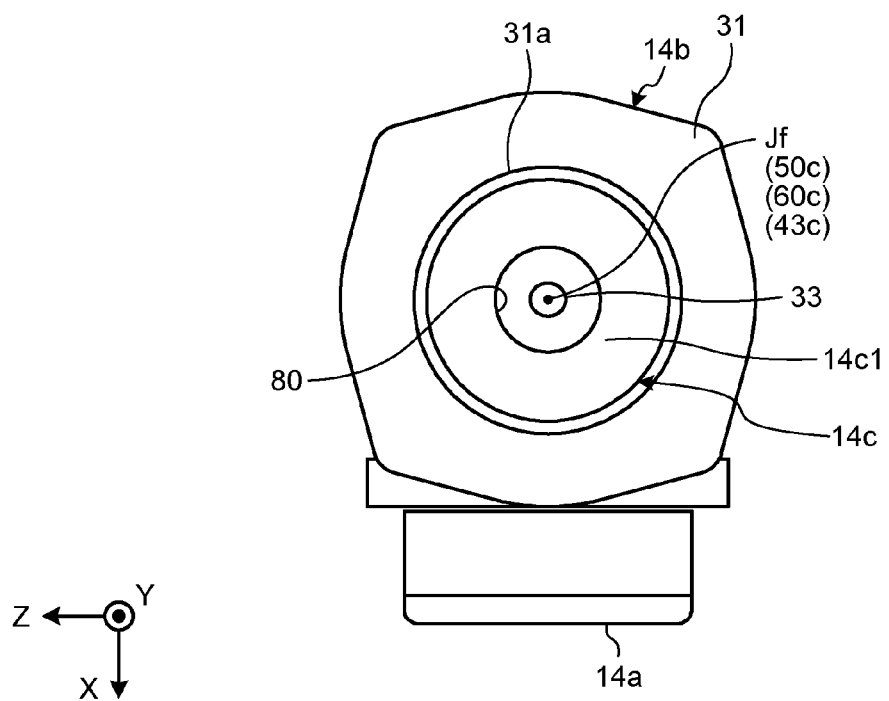
FIG. 4 is a side view of the first to third wrists illustrated in FIG. 2.

FIG. 2 is a partially cross-sectioned plan view illustrating only a part in the vicinity of the upper arm 13 and the first to third wrists 14a, 14b, and 14c that are illustrated in FIG. 1. FIG. 3 is an enlarged partially-sectional plan view illustrating a part in the vicinity of the second and the third wrists 14b and 14c illustrated in FIG. 2 in an enlarged manner. Furthermore, FIG. 4 is a side view illustrating the first to third wrists 14a, 14b, and 14c in FIG. 2 as viewed from the positive side in the Y-axis direction.

Here, in FIG. 2 or follows, for the sake of simplification in illustrating, the illustrations of the lower arm 12, the torch 2, or the like are omitted. Furthermore, FIG. 2 or follows illustrates a state that the second wrist 14b is rotated by 90 degrees about the rotational axis Je to assume a horizontal state; that is, the second wrist 14b is arranged in a posture such that the rotational axis Jd and the rotational axis Jf assume a coaxial state.

As illustrated in FIGS. 2 and 3, in the robot 1, the second wrist 14b includes a wrist body 30 and a side cover 31.

As specifically illustrated in FIG. 3, the wrist body 30 is formed into a substantially L shape as viewed from the Z-axis direction in a plan view. To be more specific, the wrist body 30 includes a first end portion 30a parallel to the Y axis in the longitudinal direction as viewed in a plan view and a second end portion 30b that is formed in a manner continuously extended from the first end portion 30a and parallel to the X axis in the longitudinal direction as viewed in a plan view.

The wrist body 30 is connected to the first wrist 14a at one surface side of the first end portion 30a thereof in a rotatable manner about the rotational axis Je. That is, the first wrist 14a and the second wrist 14b are connected to each other at one place of the first end portion 30a; namely, a so-called cantilever structure is adopted.

The second end portion 30b has a hollow portion 32. The hollow portion 32 is formed in a substantially cylindrical shape with an axis parallel to the Y axis as a center axis. The hollow portion 32 inserts thereinto a conduit cable 33 extending from the feeder 20 to the torch 2 and including a torch wire or the like. Therefore, an inner diameter d1 of the hollow portion 32 is set to such a value that the conduit cable 33 can be inserted into the hollow portion 32.

Furthermore, the above-mentioned first end portion 30a is arranged so as not to overlap with the hollow portion 32 in the X-axis direction. Due to such a constitution, a space for inserting the conduit cable 33 in the hollow portion 32 is not obstructed by the first end portion 30a thus easily inserting the conduit cable 33 into the hollow portion 32.

In addition, each of the first end portion 30a and the second end portion 30b that constitute the wrist body 30 is formed so as to have a space inside thereof. The second end portion 30b opens the side surface thereof on the positive side in the Y-axis direction, and the side cover 31 is mounted on the side surface on the opening side of the second end portion 30b. In the side cover 31, as specifically illustrated in FIG. 4, an opening 31a into which the third wrist 14c is inserted is formed.

The robot 1 includes, as described above, a power transmission mechanism 40 that transmits a driving force of the motor Mf to the third wrist 14c. The power transmission mechanism 40 arranges a part thereof in the internal space of the wrist body 30.

To explain specifically, the power transmission mechanism 40 includes a pulley and a belt that are not illustrated in the drawings, a drive-side shaft 41, an external gear 42, and a scissors gear 43. Each of the pulley and the belt that are not illustrated in the drawings is arranged at an appropriate position in the first wrist 14a to connect the motor Mf and the drive-side shaft 41.

The drive-side shaft 41 is arranged so that a rotational axis (axis line) 41a in the longitudinal direction is perpendicular to the rotational axis Je of the second wrist 14b and parallel to the rotational axis Jf of the third wrist 14c, and supported by the first end portion 30a of the wrist body 30 in a rotatable manner.

The drive-side shaft 41 is, as described above, connected to the motor Mf by way of the pulley, the belt, and the like. Therefore, the drive-side shaft 41 is rotated about the rotational axis 41a by the driving force of the motor Mf that is transmitted thereto.

Figure 5:
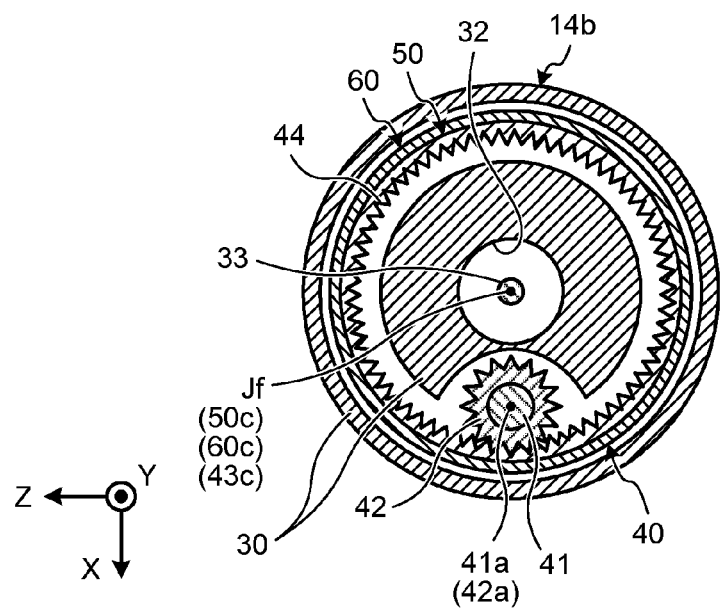
FIG. 5 is an end view taken along a line V-V in FIG. 3.

FIG. 5 is an end view taken along a line V-V in FIG. 3. The external gear 42 has, as illustrated in FIGS. 3 and 5, teeth formed in the outer circumferential surface thereof and is provided to the end portion of the drive-side shaft 41 on the positive side in the Y-axis direction. The external gear 42 is rotated about a rotational axis 42a along with the rotation of the drive-side shaft 41. In this manner, the external gear 42 is connected to the motor Mf by way of the pulley, the belt, and the like, and rotated by the driving force of the motor Mf.

Furthermore, the rotational axis 42a of the external gear 42 is set coaxially with respect to the rotational axis 41a of the drive-side shaft 41 and parallel to the rotational axis Jf. Here, the external gear 42 is, for example, a spur gear. However, the external gear 42 is not limited to the spur gear and may be another kind of gear such as a helical gear.

Figure 6:
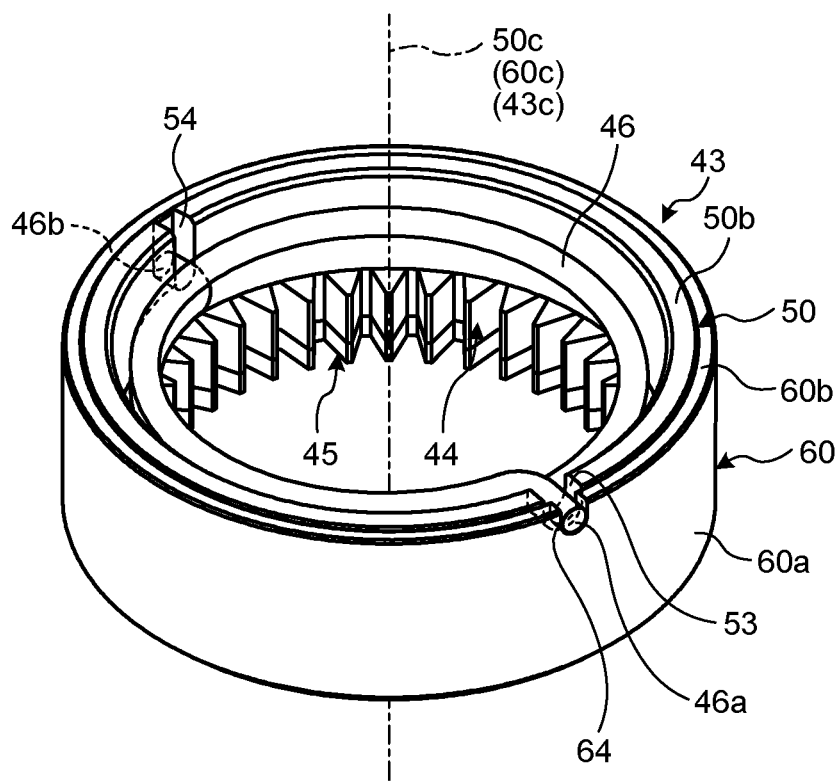
Figure 7:
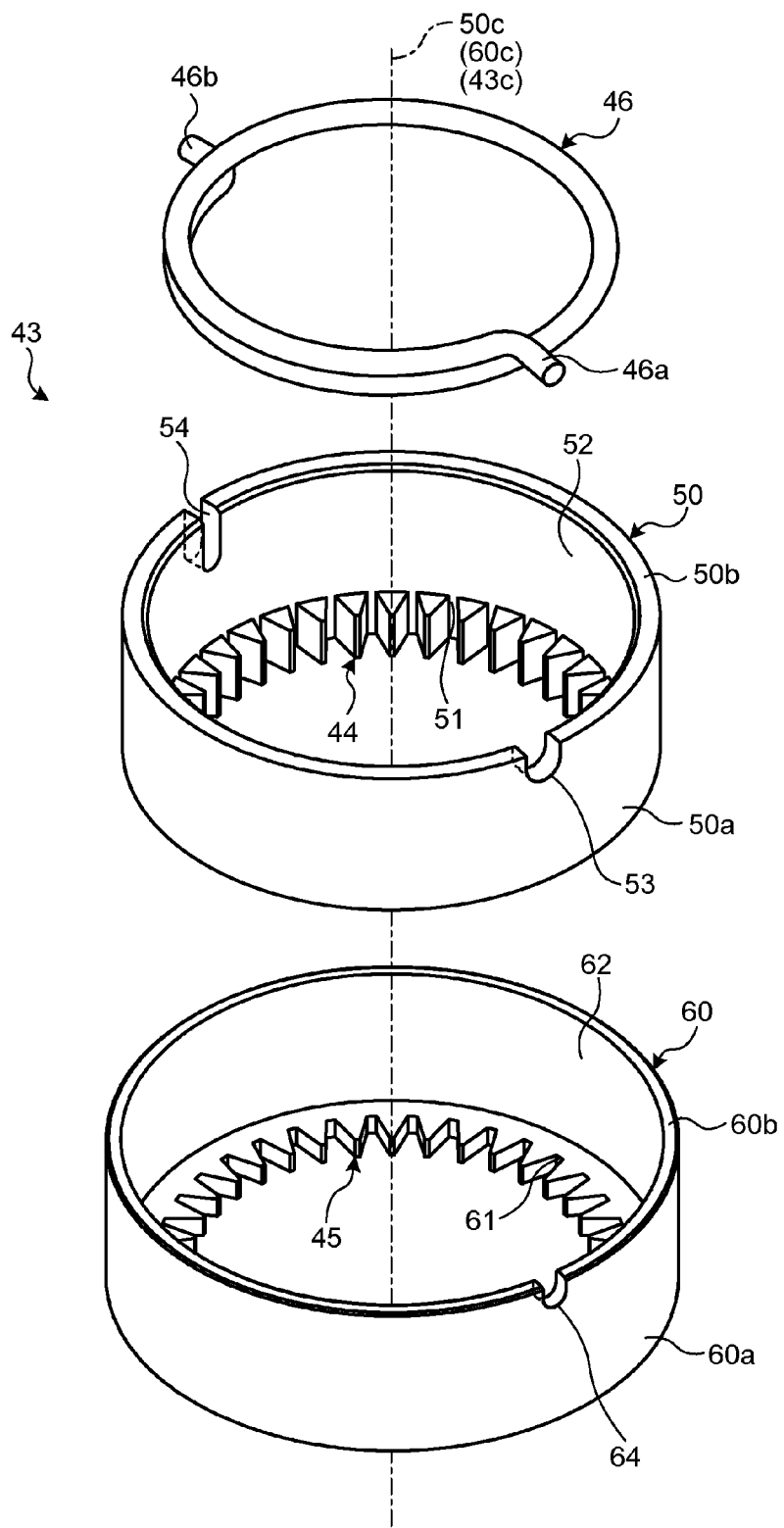
FIG. 7 is an enlarged and exploded perspective view of the scissors gear illustrated in FIG. 6.

FIG. 6 is an enlarged perspective view illustrating the scissors gear 43 taken out from the view in FIG. 3 or the like. FIG. 7 is an enlarged and exploded perspective view of the scissors gear 43 illustrated in FIG. 6.

As illustrated in FIGS. 6 and 7, the scissors gear 43 includes a main gear 44, a sub gear 45, and a spring 46.

The main gear 44 is, as illustrated in FIG. 7, formed on a first end 50a side of a first shaft 50 having a cylindrical shape. Here, the first shaft 50 is, in a state of being incorporated in the robot 1, arranged so that a center axis 50c thereof is coaxial with respect to the rotational axis Jf, and the first end 50a side thereof is positioned on the negative side in the Y-axis direction (see FIG. 3).

Furthermore, the main gear 44 is an internal gear such that teeth are formed on the inner circumferential surface of the first shaft 50, and meshed with the above-mentioned external gear 42. The main gear 44 is formed on the first end 50a side of the inner circumferential surface of the first shaft 50 and on the other hand, not formed on a second end 50b side of the inner circumferential surface of the first shaft 50.

That is, the inner circumferential surface of the first shaft 50 is provided with two kinds of portions in the direction of the center axis 50c; that is, a portion 51 (hereinafter, referred to as "formation portion 51" on which the teeth of the main gear 44 are formed and a portion 52 (hereinafter, referred to as "non-formation portion 52") on which the teeth of the main gear 44 are not formed.

Figure 8:
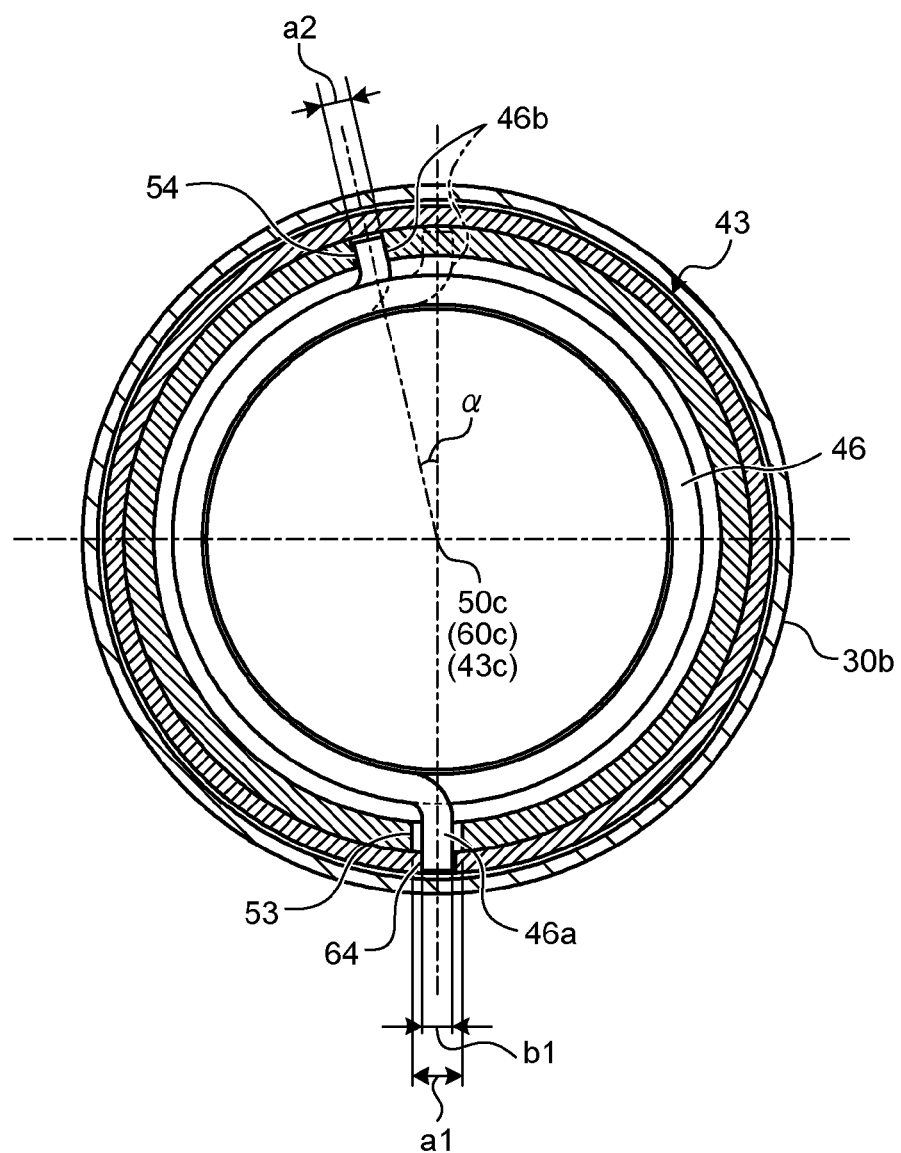
FIG. 8 is an end view taken along a line VIII-VIII in FIG. 3, the end view illustrating a part in the vicinity of the scissors gear in FIG. 3.

Furthermore, the second end 50b of the first shaft 50 forms therein an insertion groove 53 and a locking groove 54, and the spring 46 is inserted into or locked with the insertion groove 53 and the locking groove 54. FIG. 8 is an end view taken along a line VIII-VIII in FIG. 3, the end view illustrating a part in the vicinity of the scissors gear 43 in FIG. 3.

As illustrated in FIG. 8, a first end portion 46a of the spring 46 is inserted into the insertion groove 53. That is, the first end portion 46a of the spring 46 only passes through the insertion groove 53 and is not locked with the insertion groove 53. Therefore, a groove width a1 of the insertion groove 53 in the circumferential direction of the first shaft 50 has a value such that the first end portion 46a of the spring 46 can be inserted into the insertion groove 53. To be more specific, the groove width a1 of the insertion groove 53 has a value set larger than the diameter of the first end portion 46a of the spring 46.

The locking groove 54 is formed at a position shifted at a predetermined angle α in the circumferential direction of the first shaft 50 from a portion opposite to the insertion groove 53 across the center axis 50c of the first shaft 50 (an upper end portion in FIG. 8). The predetermined angle α may be set to an arbitrary value. Here, the predetermined angle α is set to a value such that 0<α<20 degrees. Here, in the explanation above, a specific value is exemplified with respect to the predetermined angle α. However, the specific value is merely exemplified, and the predetermined angle α is not limited to the specific value exemplified.

A second end portion 46b of the spring 46 is locked and secured in the locking groove 54 thus connecting the spring 46 and the second end 50b side of the first shaft 50. Therefore, a groove width a2 of the locking groove 54 in the circumferential direction of the first shaft 50 has a value such that the second end portion 46b of the spring 46 can be locked in the locking groove 54. To be more specific, the groove width a2 of the locking groove 54 has a value set smaller than the diameter of the second end portion 46b of the spring 46.

Furthermore, as specifically illustrated in FIG. 7, the insertion groove 53 and the locking groove 54 are formed so that the depths of these grooves in the direction of the center axis 50c are different from each other. To be more specific, for example, the depth of the locking groove 54 in the direction of the center axis 50c is set longer than that of the insertion groove 53.

The sub gear 45 is formed on the first end 60a side of a second shaft 60 having a cylindrical shape. Here, the second shaft 60 is, in a state of being incorporated in the robot 1, arranged so that a center axis 60c thereof is coaxial with respect to the rotational axis Jf, and the first end 60a side of the second shaft 60 is positioned on the negative side in the Y-axis direction (see FIG. 3).

Furthermore, the sub gear 45 is an internal gear such that teeth are formed on the inner circumferential surface of the second shaft 60, and meshed with the above-mentioned external gear 42 in the same manner as the main gear 44. Here, each of the main gear 44 and the sub gear 45 is, for example, a spur gear. However, each of these gears is not limited to the spur gear and may be another kind of gear such as a helical gear.

The sub gear 45 is formed on the first end 60a side of the inner circumferential surface of the second shaft 60 and on the other hand, not formed on a second end 60b side of the inner circumferential surface of the second shaft 60. That is, the inner circumferential surface of the second shaft 60 is provided with two kinds of portions in the direction of the center axis 60c; that is, a portion 61 (hereinafter, referred to as "formation portion 61" on which the teeth of the sub gear 45 are formed and a portion 62 (hereinafter, referred to as "non-formation portion 62") on which the teeth of the sub gear 45 are not formed.

The inner diameter of the non-formation portion 62 of the second shaft 60 is set larger than the outer diameter of the first shaft 50. Due to such a constitution, as illustrated in FIG. 6, the first shaft 50 can be fitted into the inside of the second shaft 60 in a relatively rotatable manner.

Here, in a state that the first and the second shafts 50 and 60 are fitted into each other, the center axes 50c and 60c are set coaxial with each other. Furthermore, each of the center axes 50c and 60c of the first and the second shafts 50 and 60 corresponds to the rotational axis of the main gear 44 or the sub gear 45 and hence, a rotational axis 43c of the scissors gear 43 is set coaxial with each of the center axes 50c and 60c of the first and the second shafts 50 and 60.

Furthermore, as described above, the main gear 44 is formed on the first end 50a side of the first shaft 50, and the sub gear 45 is formed on the first end 60a side of the second shaft 60. Due to such a constitution, the main gear 44 and the sub gear 45 are, in a state that the first and the second shafts 50 and 60 are fitted into each other, arranged adjacent to each other in the direction of each of the center axes 50c and 60c.

To proceed with the explanation of the second shaft 60, a locking groove 64 is formed in the second end 60b of the second shaft 60. As illustrated in FIGS. 6 and 8, the locking groove 64 is, in a state that the first and the second shafts 50 and 60 are fitted into each other and tooth surfaces of the main gear 44 and the sub gear 45 become coplanar with each other, formed at a position adjacent to the insertion groove 53 of the first shaft 50.

Therefore, the above-mentioned locking groove 54 of the first shaft 50 is formed at a position shifted at a predetermined angle α in the circumferential direction of the first shaft 50 from a portion opposite to the locking groove 64 of the second shaft 60 across the center axes 50c and 60c (the upper end portion in FIG. 8).

The first end portion 46a of the spring 46 is locked and secured in the locking groove 64 thus connecting the spring 46 and the second end 60b side of the second shaft 60. Therefore, a groove width b1 of the locking groove 64 in the circumferential direction of the second shaft 60 has a value such that the first end portion 46a of the spring 46 can be locked in the locking groove 64. To be more specific, the groove width b1 of the locking groove 64 has a value smaller than the diameter of the first end portion 46a of the spring 46.

Furthermore, as illustrated in FIGS. 6 and 7, the depth of the locking groove 64 in the direction of the center axis 60c is approximately same as the depth of the insertion groove 53 in the direction same as above. Therefore, the above-mentioned depth of the locking groove 54 of the first shaft 50 is set longer than that of the locking groove 64.

Due to such a constitution, the first end portion 46a and the second end portion 46b of the spring 46 can be reliably locked in the locking groove 54 of the first shaft 50 and the locking groove 64 of the second shaft 60, respectively. That is, the spring 46 is, as described later, formed in a coiled shape so that the first end portion 46a and the second end portion 46b are displaced to each other in the direction of the center axis 50c or 60c. Even when the spring 46 is formed in such a shape, the depths of the locking grooves 54 and 64 are different from each other and hence, the first end portion 46a and the second end portion 46b of the spring 46 can be reliably locked in the locking grooves 54 and 64, respectively.

The spring 46 is, for example, a torsion spring (helical torsion spring) capable of being elastically deformed in the circumferential direction. Here, the spring 46 is constituted as the torsion spring. However, the torsion spring is merely exemplified and the spring 46 is not limited to the torsion spring. That is, the spring 46 may be another kind of spring capable of being elastically deformed in the circumferential direction; for example, a flat spring, a spiral spring, or the like.

Furthermore, in FIG. 8, the spring 46 in a state before the spring 46 is fixed in the first and the second shafts 50 and 60 is indicated by an imaginary line. As indicated by the imaginary line in FIG. 8, the spring 46 is formed in a shape such that a columnar wire rod is wound by a predetermined number of turns (1.5 turns, for example; that is, 540 degrees around the center axis 50c or 60c). Here, in the description above, the predetermined number of turns of the spring 46 is exemplified by a specific value. However, the number of turns is not limited to the value exemplified, and may be changed in accordance with the specifications of the scissors gear 43.

The spring 46 has the first end portion 46a and the second end portion 46b projecting outwardly in the diameter direction. Furthermore, the outer diameter of the spring 46 is set smaller than the inner diameter of the first shaft 50.

The spring 46 constituted as described above is attached to the inside of the first and the second shafts 50 and 60 while being elastically deformed in the circumferential direction. In this manner, the spring 46 has the first end portion 46a connected to the second shaft 60 having the sub gear 45, and the second end portion 46b connected to the first shaft 50 having the main gear 44 by way of the portion wound by the predetermined number of turns from the first end portion 46a along the circumference of the scissors gear 43.

Due to such a constitution, although the scissors gear 43 has a simple constitution, it is possible to apply biasing force respectively to the main gear 44 and the sub gear 45 in the directions different from each other.

To be more specific, in a state that the first and the second shafts 50 and 60 are fitted into each other and the insertion groove 53 and the locking groove 64 are aligned with each other in the diameter direction, the first end portion 46a of the spring 46 is inserted into the insertion groove 53 of the first shaft 50 and, at the same time, locked in the locking groove 64 of the second shaft 60. On the other hand, the second end portion 46b of the spring 46 is locked in the locking groove 54 of the first shaft 50.

As described above, the locking groove 54 is formed at a position shifted by the predetermined angle α in the circumferential direction from the portion opposite to the locking groove 64 across the center axes 50c and 60c and hence, the spring 46 is locked with the first and the second shafts 50 and 60 in a state that the spring 46 is elastically deformed by the predetermined angle α.

Due to such a constitution, the spring 46 elastically deformed applies biasing force respectively to the main gear 44 and the sub gear 45 in the rotational directions different from each other. To be more specific, the spring 46 applies a biasing force to the main gear 44 of the first shaft 50 in the clockwise direction in FIG. 8, and applies a biasing force to the sub gear 45 of the second shaft 60 in the counterclockwise direction in FIG. 8.

Furthermore, the spring 46 is connected to the second end 50b side of the first shaft 50 and the second end 60b side of the second shaft 60. Due to such a constitution, the spring 46 can be easily attached to the first and the second shafts 50 and 60 thus improving the workability of assembling the scissors gear 43.

Furthermore, the spring 46 is formed in a coiled shape wound by the predetermined number of turns and hence, the spring 46 is possible to apply stable biasing force to the main gear 44 and the sub gear 45 while performing the relative rotational displacement on the gears.

The scissors gear 43 is constituted as described above and hence, a mating gear; that is, the external gear 42 is meshed with the main gear 44 and the sub gear 45 in such a manner that the tooth of the external gear 42 is sandwiched between the teeth of the main gear 44 and the sub gear 45 thus reducing backlash.

Here, in the scissors gear 43, the first shaft 50 and the second shaft 60 are engaged with each other with the use of a bolt 70 (illustrated only in FIGS. 2 and 3) while maintaining a state that the first shaft 50 and the second shaft 60 can be relatively rotated. Hence, the disengagement of the first and the second shafts 50 and 60 that are fitted into each other is prevented.

To be more specific, the bolt 70 is, for example, arranged in the direction such that the axis line thereof is perpendicular to the center axes 50c and 60c, and inserted into bolt holes 55 and 65 respectively drilled in the first and the second shafts 50 and 60.

The diameter of the bolt hole 65 of the second shaft 60 is set larger than the shaft diameter of the bolt 70 or the width across corners of the head of the bolt 70. That is, the diameter of the bolt hole 65 is set so that there exists play between the bolt 70 and the bolt hole 65. Furthermore, female threads corresponding to the bolt 70 are formed in the bolt hole 55 of the first shaft 50.

Due to such a constitution, even when the bolt 70 is inserted into the bolt holes 55 and 65 and the first and the second shafts 50 and 60 are engaged with each other, the second shaft 60 is capable of being rotated relative to the first shaft 50. Furthermore, the first and the second shafts 50 and 60 are engaged with each other by the bolt 70 and hence, the first and the second shafts 50 and 60 fitted into each other are not disengaged from each other.

Here, in the above description, the first and the second shafts 50 and 60 are engaged with each other by the bolt 70 to assemble the scissors gear 43. However, the method for assembling the scissors gear 43 is not limited to above. That is, for example, the following procedures may be adopted for assembling the scissors gear 43; that is, first, the first and the second shafts 50 and 60 are temporarily engaged with each other by a temporary joint bolt, the spring 46 is attached to the first and the second shafts 50 and 60 in a state above and thereafter, the first and the second shafts 50 and 60 are engaged with each other by the bolt 70 and finally, the temporary joint bolt is removed. In this manner, the method for assembling the scissors gear 43 can be arbitrarily changed.

To explain also in conjunction with FIG. 3, the scissors gear 43 is constituted so that the main gear 44 and the sub gear 45 are meshed with the external gear 42 and rotatably supported about the rotational axis 43c with the use of a bearing (support part) 72.

The rotational axis 43c of the scissors gear 43 incorporated in the robot 1 is parallel to the rotational axis 42a of the external gear 42 and coaxial with the rotational axis Jf. Here, to be more specific, the bearing 72 is, for example, a rolling bearing. However, the bearing 72 is not limited to the rolling bearing and, for example, may be another kind of bearing such as a plain bearing.

The above-mentioned bearing 72 is incorporated in the second wrist 14b. To be more specific, the bearing 72 is arranged in the internal space of the second end portion 30b of the wrist body 30 and arranged so as to abut on the inside of the first shaft 50; that is, to be accurate, on the non-formation portion 52.

The scissors gear 43 is fastened to the third wrist 14c with bolts 75 on the second end 50b side of the first shaft 50 having the main gear 44. Therefore, the scissors gear 43 transmits the driving force input from the motor Mf by way of the drive-side shaft 41 and the external gear 42 to the third wrist 14c to drive the third wrist 14c in a rotating manner. The above-mentioned main gear 44 corresponds to first rotating means for rotating by the driving force. Furthermore, the sub gear 45 corresponds to second rotating means for rotating by the driving force.

Here, the positional relation between the scissors gear 43 and the bearing 72 is explained in detail. The spring 46 of the scissors gear 43 is arranged adjacent to the bearing 72 in the direction of the rotational axis 43c of the scissors gear 43. That is, the spring 46 is formed in a shape having the substantially same diameter as that of the bearing 72 and arranged at a position such that at least a part thereof overlaps with the bearing 72 as viewed in the direction of the rotational axis 43c.

Due to such a constitution, even when the scissors gear 43 having the spring 46 is used as a gear for the power transmission mechanism 40, the width (indicated by a symbol W in FIG. 3) of the scissors gear 43 in the diameter direction can be reduced thus miniaturizing the scissors gear 43.

That is, assuming that the spring 46 is arranged adjacent to the bearing 72 in the diameter direction (X-axis direction) of the scissors gear 43, there exists the possibility that the width W of the scissors gear 43 is increased by an amount corresponding to the size of the spring 46.

However, in the present embodiment, the spring 46 is arranged adjacent to the bearing 72 in the direction of the rotational axis 43c thus reducing the width W of the scissors gear 43 and miniaturizing the scissors gear 43. Furthermore, the scissors gear 43 is miniaturized thus reducing the occupation space of the power transmission mechanism 40 also. The bearing 72 corresponds to support means for supporting the first and second rotating means in a rotatable manner. Furthermore, the spring 46 corresponds to means for applying biasing force.

Furthermore, the first shaft 50 connects the third wrist 14c to the second end 50b side thereof and supported by the bearing 72 at a position closer to the second end 50b side than the formation portion 51 on which the main gear 44 is formed. The spring 46 is arranged adjacent to the third wrist 14c that is an output side of the scissors gear 43 with respect to the bearing 72.

Due to such a constitution, it is possible to miniaturize the scissors gear 43 assuredly. That is, constitutional parts on the side of inputting the driving force of the motor Mf, such as the drive-side shaft 41 or the external gear 42, are connected on the first end 50a side of the first shaft 50. Therefore, assuming that the spring 46 is arranged adjacent to the side of inputting the driving force of the motor Mf with respect to the bearing 72, there exists the possibility that the size of the scissors gear 43 is increased by an amount corresponding to the size of the spring 46 in the direction of the rotational axis 43c.

Accordingly, in the present embodiment, the spring 46 is arranged adjacent to the third wrist 14c that is located on the output side of the scissors gear 43 with respect to the bearing 72 and hence, the scissors gear 43 is not increased in size in the direction of the rotational axis 43c thus miniaturizing the scissors gear 43 assuredly.

Furthermore, the scissors gear 43 is connected to the third wrist 14c that is a distal-end link in the wrist 14 having a plurality of links thus miniaturizing a part close to the end effector in the robot 1. Due to such a constitution, for example, it is possible to move the third wrist 14c or the torch 2 that is an end effector to an object to be worked that is placed in a comparatively narrow place thus improving the performance of the robot 1 for access to the object to be worked.

Furthermore, each of the main gear 44 and the sub gear 45 of the scissors gear 43 is an internal gear thus reducing the width of a whole gear mechanism including the scissors gear 43 and the external gear 42 in the diameter direction (X-axis direction). That is, for example, assuming that each of the main gear 44 and the sub gear 45 is an external gear, which is meshed with the external gear 42, the width of the whole gear mechanism including the scissors gear 43 and the external gear 42 in the diameter direction assumes approximately a value obtained by adding the diameters of the two external gears, the value being larger than the width of a whole gear mechanism in the case where each of the main gear 44 and the sub gear 45 is an internal gear.

Accordingly, in the robot 1 according to the present embodiment, each of the main gear 44 and the sub gear 45 is the internal gear, which is connected to the external gear 42 inside the scissors gear 43. Due to such a constitution, the width of the whole gear mechanism has only a value corresponding to the width W of the scissors gear 43 thus reducing the width of the whole gear mechanism and, as a result, miniaturizing the power transmission mechanism 40 as a whole.

Furthermore, as described above, the bearing 72 is arranged inside the scissors gear 43 (to be accurate, inside the first shaft 50) to support the scissors gear 43. Due to such a constitution, it is possible to prevent the power transmission mechanism 40 from being increased in size.

That is, for example, assuming that the bearing 72 is arranged outside the scissors gear 43 (to be accurate, outside the second shaft 60), the power transmission mechanism 40 is increased in size by an amount corresponding to the size of the bearing 72 in the diameter direction. However, in the present embodiment, the bearing 72 is arranged inside the scissors gear 43 thus preventing the power transmission mechanism 40 from being increased in size.

Furthermore, the bearing 72 is arranged so as to abut on the inner circumferential surface of the non-formation portion 52 of the first shaft 50. Due to such a constitution, the wall thickness of the non-formation portion 52 in the diameter direction can be made thinner than that of the formation portion 51 and further, reduced to a value such that a load imposed from the bearing 72 is allowed thus realizing the miniaturization and the reduction in weight of the first shaft 50.

Furthermore, the wall thickness of the non-formation portion 52 in the diameter direction is reduced thus increasing the size of the hollow portion on the inner circumferential side of the scissors gear 43. As illustrated in the drawings, the conduit cable 33 is inserted into the hollow portion of the scissors gear 43. As described above, the hollow portion is increased in size and hence, it is possible to insert a comparatively thick conduit cable such as a conduit cable used for a servo torch or a tandem torch. Due to such a constitution, it is possible to adapt the robot 1 to various kinds of welding operations.

Furthermore, in the second wrist 14b, a first oil seal 76a is inserted between the wrist body 30 and the third wrist 14c, and s second oil seal 76b is inserted between the side cover 31 and the third wrist 14c. Due to such a constitution, it is possible to prevent oil for lubricating the scissors gear 43 or the like from leaking outside.

Furthermore, the spring 46 of the scissors gear 43 mentioned above is arranged in the vicinity of the first oil seal 76a. To be more specific, the spring 46 is arranged adjacent to the scissors gear 43 in the diameter direction with respect to the first oil seal 76a. Due to such a constitution, it is possible to effectively use a space in the vicinity of the first oil seal 76a and to form the constitution in the vicinity of a portion connecting the scissors gear 43 and the third wrist 14c in a compact shape.

As illustrated in FIG. 5, the pitch circle diameter of the external gear 42 is set smaller than the pitch circle diameter of the scissors gear 43 and, for example, set smaller than approximately one-third of the pitch circle diameter of the scissors gear 43. Due to such a constitution, it is possible to largely change the speed between the external gear 42 and the scissors gear 43; to be more specific, it is possible to reduce the speed between the external gear 42 and the scissors gear 43 thus increasing the driving force input from the motor Mf and, at the same time, it is also possible to ensure the above-mentioned hollow portion on the inner circumferential side of the scissors gear 43. Here, the above-mentioned pitch circle diameter of each gear is merely exemplified, and the pitch circle diameter of each gear is not limited to above. For example, the pitch circle diameter of the external gear 42 may be set larger than one-third of the pitch circle diameter of the scissors gear 43.

Furthermore, the wrist flange 14c1 of the third wrist 14c includes, as illustrated in FIGS. 3 and 4, a hollow portion 80 formed in a hollow shape. A diameter d2 of the hollow portion 80 is set substantially equal to the diameter d1 of the hollow portion 32; that is, the diameter d2 of the hollow portion 80 is set to a value such that the conduit cable 33 can be inserted into the hollow portion 80. Due to such a constitution, the conduit cable 33 can easily pass through the hollow portion 32, a hollow portion on the inner circumferential side of the scissors gear 43, and the hollow portion 80.

As illustrated in FIGS. 2, 3 and 5 also, the hollow portion 80 and the external gear 42 are arranged such that the hollow portion 80 and the external gear 42 do not interfere with each other as viewed in the direction of the rotational axis 42a of the external gear 42. That is, the external gear 42 is arranged so as to be spaced apart from the hollow portion 80 by the predetermined distance in the direction perpendicular to the rotational axis 42a. Due to such a constitution, it is possible to increase the diameter d2 of the hollow portion 80 thus further easily inserting the conduit cable 33 into the hollow portion 80.

As described above, in the first embodiment, in the robot 1, the scissors gear 43 is arranged adjacent to the bearing 72 in the direction of the rotational axis 43c of the scissors gear 43, and includes the spring 46 that applies biasing force to the main gear 44 and the sub gear 45 in the directions different from each other. Due to such a constitution, in the robot 1, it is possible to miniaturize the scissors gear 43 thus reducing the occupation space of the power transmission mechanism 40 including the scissors gear 43.

Figure 9:
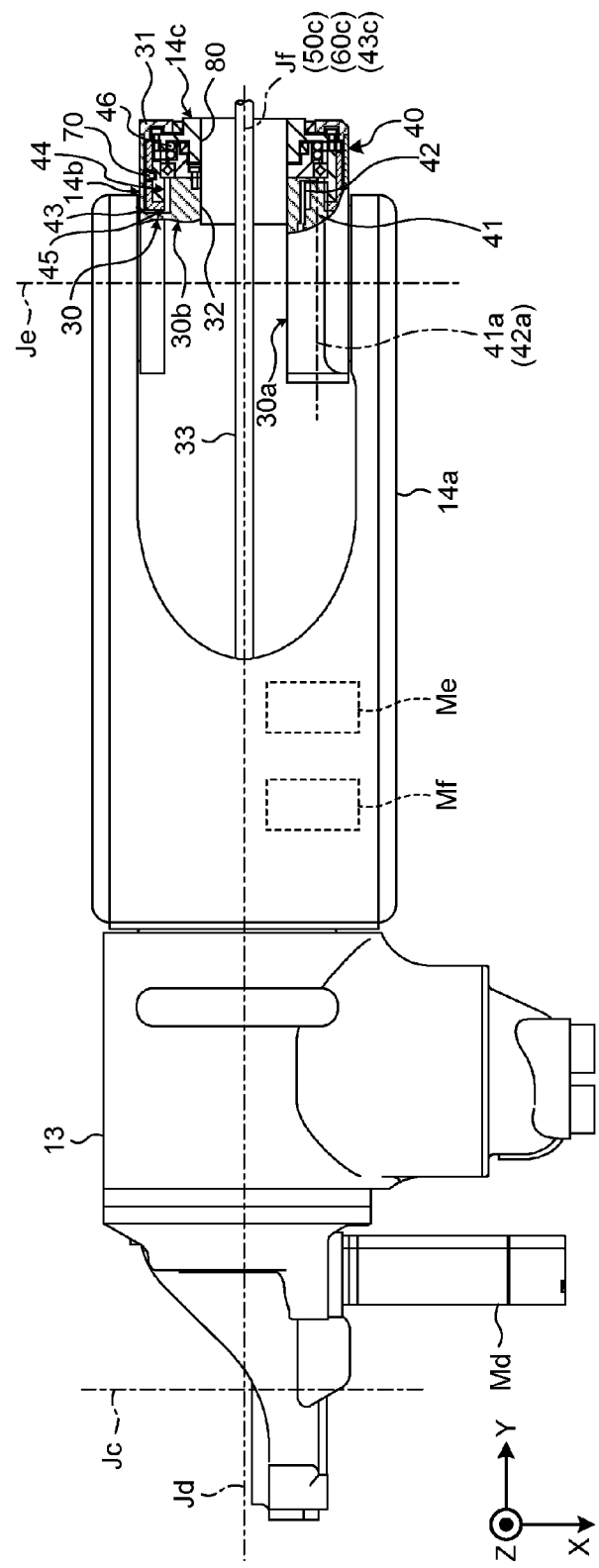
FIG. 9 is a partially cross-sectioned plan view illustrating a modification of the robot according to the first embodiment, the modification being made with respect to only a part in the vicinity of the upper arm and the first to third wrists.

Here, in the description above, in the robot 1, a connection portion between the first wrist 14a and the second wrist 14b has "the cantilever structure". However, the structure of the connection portion is not limited to the cantilever structure. For example, the first and the second wrists 14a and 14b may be connected to each other as illustrated in FIG. 9. That is, as illustrated in FIG. 9, the first wrist 14a is formed in a bifurcated manner at a portion thereof to which the second wrist 14b is connected and pivotally supports the second wrist 14b from both sides of the portion formed in a bifurcated manner; namely, a so-called "double-sided support structure" may be adopted.

Next, a second embodiment is explained.

Figure 10:
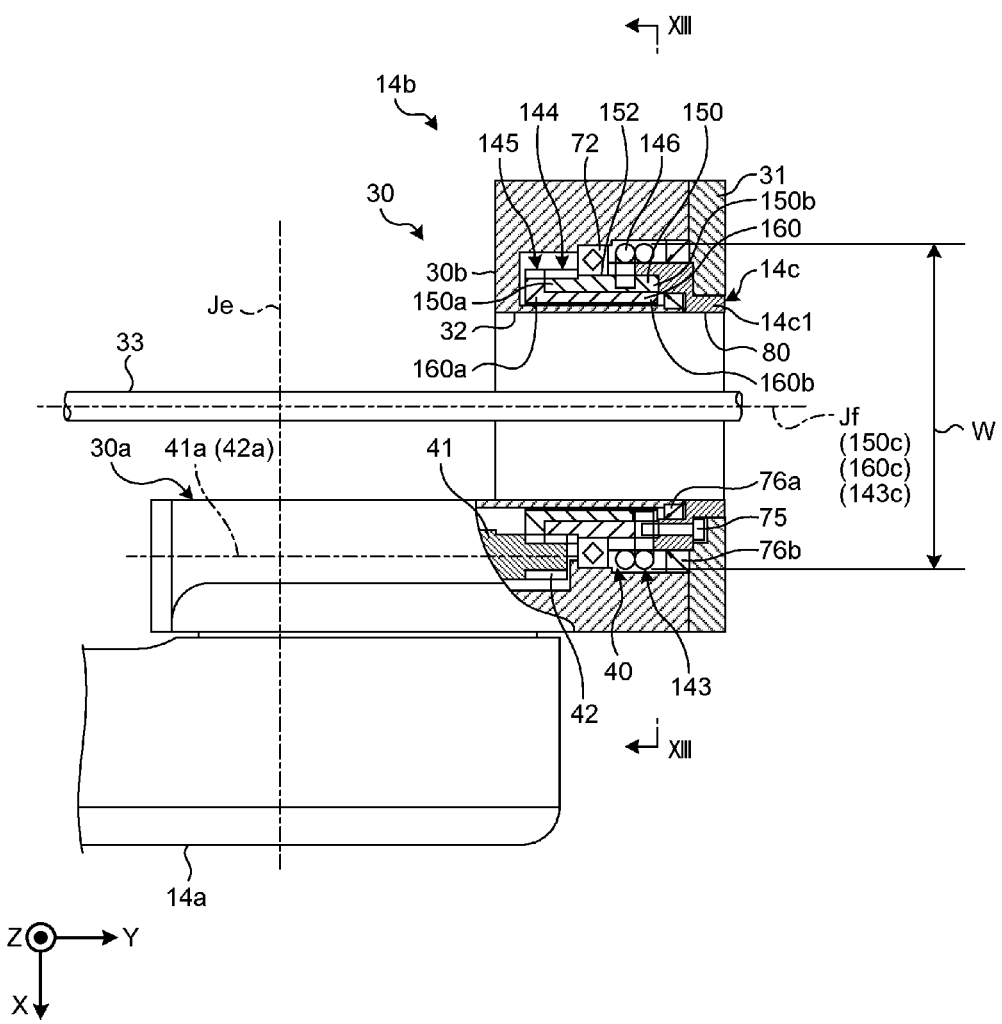
FIG. 10 is an enlarged partially-sectional plan view illustrating a part in the vicinity of second and third wrists of a robot according to a second embodiment in an enlarged manner.

FIG. 10 is an enlarged partially-sectional plan view similar to FIG. 3, the view illustrating a part in the vicinity of the second and the third wrists 14b and 14c of the robot 1 according to the second embodiment in an enlarged manner. Hereinafter, parts having identical constitutions as in the first embodiment are given same numerals and their explanations are omitted.

To explain the second embodiment focusing on points that make the second embodiment different from the first embodiment, a robot 1 according to the second embodiment is constituted in such a manner that each of a main gear 144 and a sub gear 145 of a scissors gear 143 is an external gear.

Hereinafter, for convenience in understanding, an external gear 42 provided to a drive-side shaft 41 is referred to as "first external gear 42". Furthermore, an external gear that is the main gear 144 or the sub gear 145 may be also referred to as "second external gear".

Figure 11:
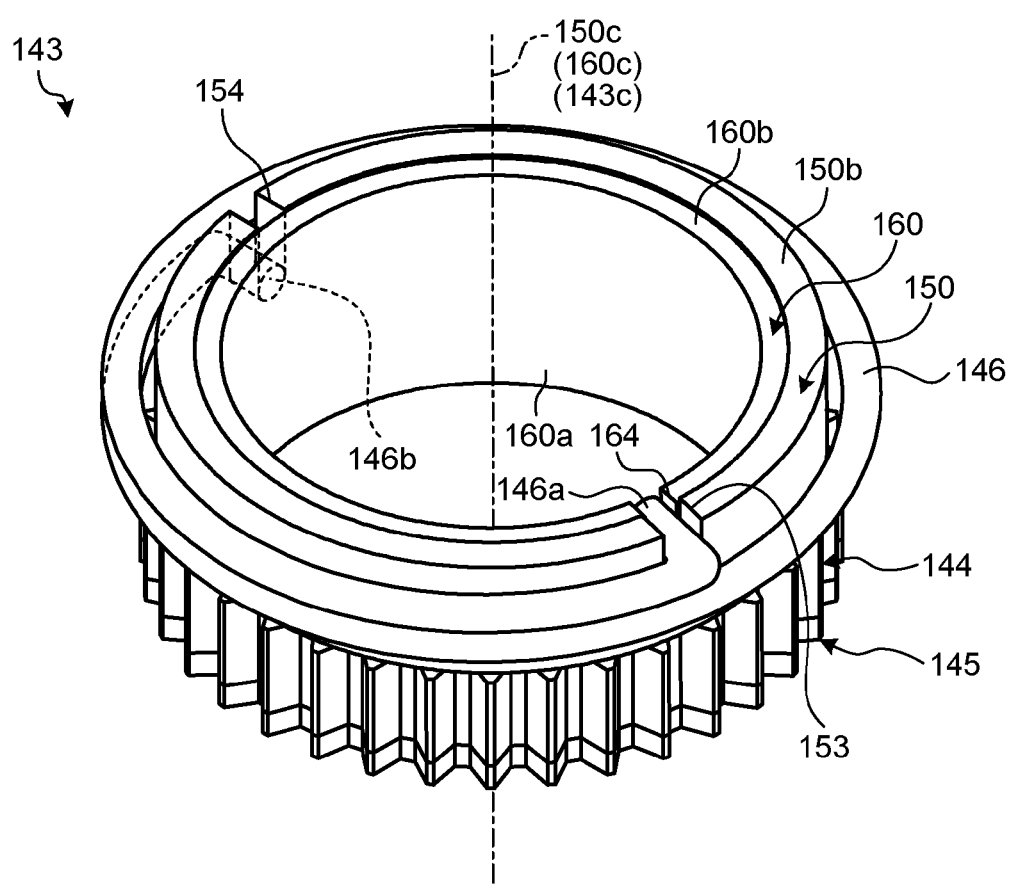
FIG. 11 is an enlarged perspective view illustrating a scissors gear taken out from the view in FIG. 10.
Figure 12:
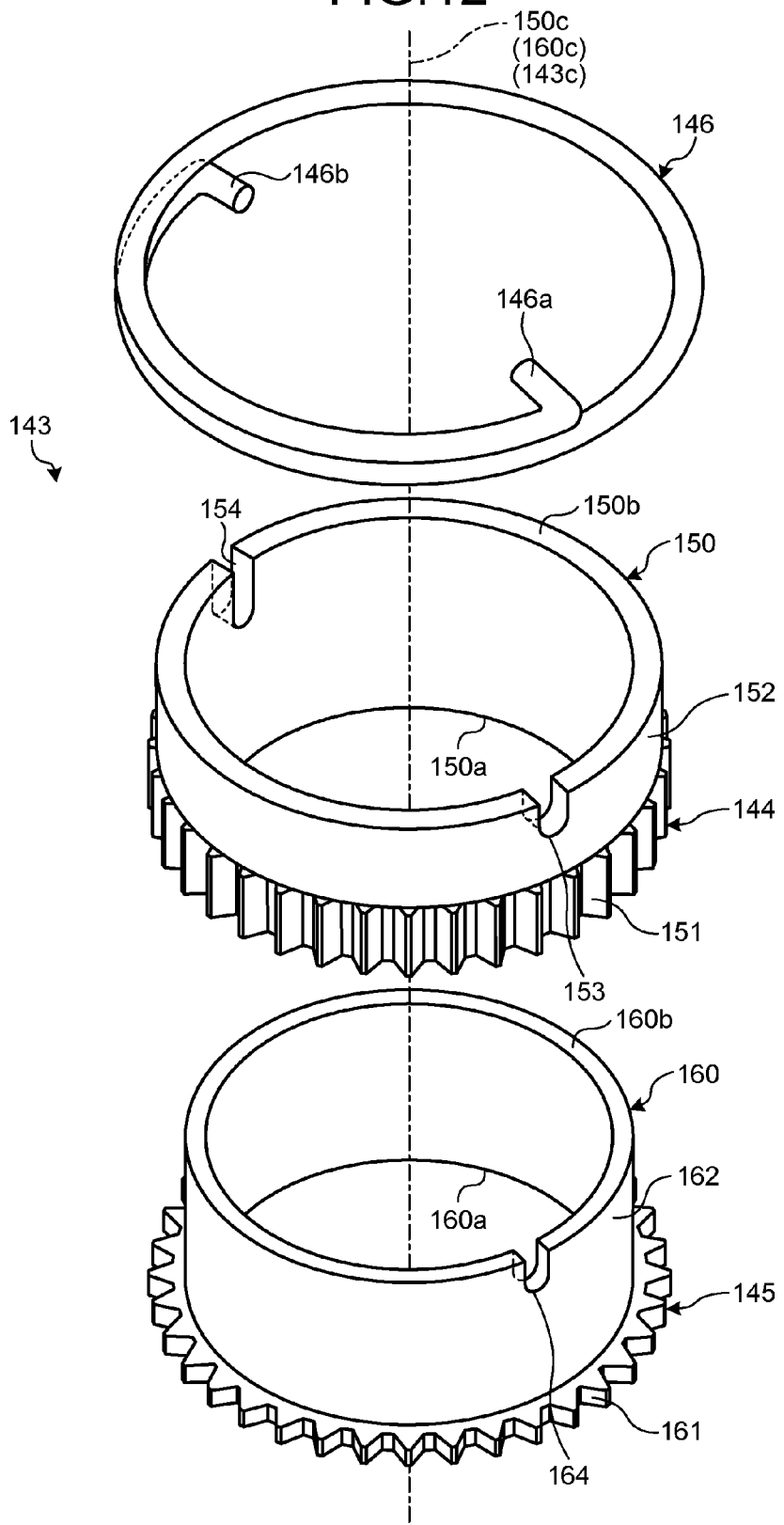
FIG. 12 is an enlarged and exploded perspective view of the scissors gear illustrated in FIG. 11.

As illustrated in FIG. 10, the first external gear 42 is meshed with the scissors gear 143. FIG. 11 is an enlarged perspective view illustrating the scissors gear 143 taken out from the view in FIG. 10. FIG. 12 is an enlarged and exploded perspective view of the scissors gear 143 illustrated in FIG. 11. Furthermore, FIG. 13 is an end view taken along a line XIII-XIII in FIG. 10, the end view illustrating a part in the vicinity of the scissors gear 143 in FIG. 10.

Figure 13:
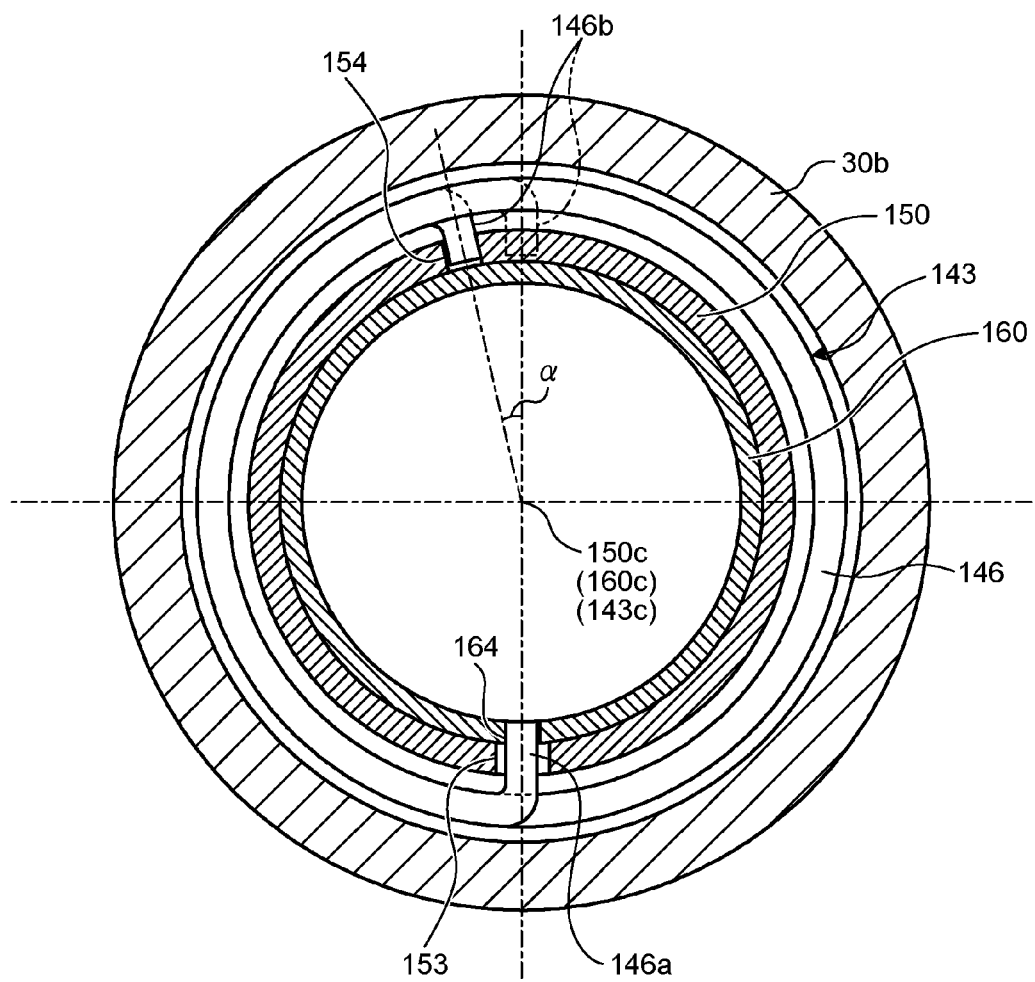
FIG. 13 is an end view taken along a line XIII-XIII in FIG. 10, the end view illustrating a part in the vicinity of the scissors gear in FIG. 10.

As illustrated in FIGS. 11 to 13, the scissors gear 143 includes the main gear 144 and the sub gear 145.

The main gear 144 is, as illustrated in FIG. 12, formed on a first end 150a side of a first shaft 150 having a cylindrical shape. Furthermore, the main gear 144 is an external gear (second external gear) whose teeth are formed on an outer circumferential surface of the first shaft 150, and meshed with the first external gear 42.

The main gear 44 is formed on the first end 150a side of the outer circumferential surface of the first shaft 150 and on the other hand, not formed on a second end 150b side of the outer circumferential surface of the first shaft 150. That is, the outer circumferential surface of the first shaft 150 is provided with two kinds of portions in the direction of a center axis 150c; that is, a formation portion 151 on which the teeth of the main gear 144 are formed and a non-formation portion 152 on which the teeth of the main gear 144 are not formed.

Furthermore, the second end 150b of the first shaft 150 forms therein an insertion groove 153 and a locking groove 154, and a spring 146 is inserted into the insertion groove 153 and locked with the locking groove 154. The constitutions of the insertion groove 153 and the locking groove 154 are substantially same as those of the insertion groove 53 and the locking groove 54 in the first embodiment, and their further explanations are omitted.

The sub gear 145 is formed on a first end 160a side of a second shaft 160 having a cylindrical shape. Furthermore, the sub gear 145 is an external gear (second external gear) whose teeth are formed on the outer circumferential surface of the second shaft 160, and meshed with the first external gear 42 in the same manner as the main gear 144.

The sub gear 145 is formed on the first end 160a side of the outer circumferential surface of the second shaft 160 and on the other hand, not formed on a second end 160b side of the outer circumferential surface of the second shaft 160. That is, the outer circumferential surface of the second shaft 160 is provided with two kinds of portions in the direction of a center axis 160c; that is, a formation portion 161 on which the teeth of the sub gear 145 are formed and a non-formation portion 162 on which the teeth of the sub gear 145 are not formed.

The outer diameter of the non-formation portion 162 of the second shaft 60 is set smaller than the inner diameter of the first shaft 150. Due to such a constitution, as illustrated in FIG. 11, the first shaft 150 can be fitted over the outside of the second shaft 160 in a relatively rotatable manner.

Furthermore, as described above, the main gear 144 is formed on the first end 150a side of the first shaft 150, and the sub gear 145 is formed on the first end 160a side of the second shaft 160. Due to such a constitution, the main gear 144 and the sub gear 145 are, in a state that the first and the second shafts 150 and 160 are fitted into each other, arranged adjacent to each other in the direction of each of the center axes 150c and 160c.

The locking groove 164 is formed in the second end 160b of the second shaft 160. The constitution of the locking groove 164 is substantially same as that of the locking groove 64 in the first embodiment, and their specific explanations are omitted.

The spring 146 is, in the same manner as the spring 46 in the first embodiment, a torsion spring (helical torsion spring) or the like capable of being elastically deformed in the circumferential direction.

The spring 146 has a first end portion 146a and a second end portion 146b projecting inwardly in the diameter direction. Furthermore, the inner diameter of the spring 146 is set larger than the outer diameter of the non-formation portion 152 of the first shaft 150. Here, the other constitutions such as the number of turns of the spring 146 are substantially same as those of the spring 46 in the first embodiment.

The spring 146 constituted as described above is attached to the outside of the first and the second shafts 150 and 160 while being elastically deformed in the circumferential direction. Due to such a constitution, although the scissors gear 143 has a simple constitution, it is possible to apply biasing force respectively to the main gear 144 and the sub gear 145 in the directions different from each other.

To be more specific, in a state that the first and the second shafts 150 and 160 are fitted into each other and the insertion groove 153 and the locking groove 164 are aligned with each other in the diameter direction, the first end portion 146a of the spring 146 is inserted into the insertion groove 153 of the first shaft 150 and, at the same time, locked in the locking groove 164 of the second shaft 160. On the other hand, the second end portion 146b of the spring 146 is locked in the locking groove 154 of the first shaft 150.

In this case, the spring 146 is locked with the first and the second shafts 150 and 160 in a state that the spring 146 is elastically deformed by the predetermined angle α. Due to such a constitution, the spring 146 elastically deformed applies biasing force respectively to the main gear 144 and the sub gear 145 in the rotational directions different from each other.

To be more specific, the spring 146 applies a biasing force to the main gear 144 of the first shaft 150 in the clockwise direction in FIG. 13, and applies a biasing force to the sub gear 145 of the second shaft 160 in the counterclockwise rotation in FIG. 10.

The scissors gear 143 is constituted as described above and hence, the first external gear 42 is meshed with the main gear 144 and the sub gear 145 in such a manner that the tooth of the first external gear 42 is sandwiched between the teeth of the main gear 144 and the sub gear 145 thus reducing backlash.

Here, in the scissors gear 143, the first shaft 150 and the second shaft 160 are engaged with each other with the use of a bolt (not illustrated in the drawings) while maintaining a state that the first shaft 150 and the second shaft 160 can be relatively rotated. The constitution described above is same as the case in the first embodiment.

To explain also in conjunction with FIG. 10, in the scissors gear 143 constituted as described above, the main gear 144 and the sub gear 145 are meshed with the first external gear 42 and rotatably supported about a rotational axis 143c with the use of a bearing 72.

The above-mentioned bearing 72 is arranged outside the first shaft 150; to be accurate, the bearing 72 is arranged so as to abut on the non-formation portion 152. The scissors gear 143 is fastened to the third wrist 14c with bolts 75 on the second end 150b side of the first shaft 150 having the main gear 144. Therefore, the scissors gear 143 transmits the driving force input from the motor Mf by way of the drive-side shaft 41 and the first external gear 42 to the third wrist 14c to drive the third wrist 14c in a rotatable manner.

Here, the positional relation between the scissors gear 143 and the bearing 72 is explained in detail. The spring 146 of the scissors gear 143 is, in the same manner as the case of the first embodiment, arranged adjacent to the bearing 72 in the direction of the rotational axis 143c of the scissors gear 143. That is, the spring 146 is formed in a shape having the substantially same diameter as that of the bearing 72 and arranged at a position such that at least a part thereof overlaps with the bearing 72 as viewed in the direction of the rotational axis 143c.

In the second embodiment, due to such a constitution as described above, even when the scissors gear 143 having the spring 146 is used as a gear for the power transmission mechanism 40, the width W of the scissors gear 143 in the diameter direction can be reduced thus miniaturizing the scissors gear 143.

That is, assuming that the spring 146 is arranged adjacent to the bearing 72 in the diameter direction (X-axis direction) of the scissors gear 143, there exists the possibility that the width W of the scissors gear 143 is increased by an amount corresponding to the size of the spring 146.

However, in the second embodiment, the spring 146 is arranged adjacent to the bearing 72 in the direction of the rotational axis 143c thus reducing the width W of the scissors gear 143 and miniaturizing the scissors gear 143. Furthermore, the scissors gear 143 is miniaturized thus also reducing the occupation space of the power transmission mechanism 40.

Furthermore, in the second embodiment, the scissors gear 143 is constituted such that each of the main gear 144 and the sub gear 145 is the second external gear meshed with the first external gear 42 thus obtaining effects same as the case of the first embodiment as described above.

Furthermore, the bearing 72 is arranged so as to abut on the outer circumferential surface of the non-formation portion 152 of the first shaft 150. Due to such a constitution, the wall thickness of the non-formation portion 152 in the diameter direction can be made thinner than that of the formation portion 151 and further, reduced to a value such that a load imposed from the bearing 72 is allowed thus realizing the miniaturization and reduction in weight of the first shaft 150. Here, the other constitutions and advantageous effects are same as the case of the first embodiment, and their explanations are omitted.

Here, in the above-mentioned embodiments, the power transmission mechanism 40 that connects the motor Mf and the third wrist 14c includes the scissors gear 43 or 143. However, the embodiments are not limited to this. That is, in a power transmission mechanism that connects a motor and the other component; for example, the motor Ma and the swivel 11, the motor Mb and the lower arm 12, the motor Mc and the upper arm 13, the motor Md and the first wrist 14a, or the motor Me and the second wrist 14b, the above-mentioned scissors gear 43 or 143 may be used.

Furthermore, the robot 1 is constituted as a robot for arc welding. However, the embodiments are not limited to this, and the other robots may be adopted. That is, in the description above, the robot 1 includes the torch 2 as an end effector. However, a robot including a hand for gripping a workpiece, a gripper for sucking and holding a workpiece, or the like as an end effector to transfer the workpiece by way of the hand or the like may be adopted.

Furthermore, the robot 1 is explained by taking a six-axis robot as an example. However, the embodiments are not limited to this, and it is possible to use a robot other than the six-axis robot such as a seven-axis robot or an eight-axis robot.

In addition, in the robot 1 in the second embodiment, the connection portion between the first wrist 14a and the second wrist 14b is formed of the "cantilever structure". However, in the same manner as the case of the first embodiment, the "double-sided support structure" may be adopted.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A robot comprising:
   a first link;
   a second link connected to the first link in a rotatable manner;
   an actuator that drives the second link in a rotatable manner;
   a scissors gear that includes a main gear and a sub gear and outputs driving force from the actuator to the second link; and
   a support part that is attached to the first link to support the scissors gear in a rotatable manner, and
   wherein the scissors gear being arranged adjacent to the support part in a direction of a rotational axis of the scissors gear, and
   wherein the scissors gear includes;
      a first shaft having a first end and a second end, the first end of the first shaft being near the first link and the second end of the first shaft being near the second link, the first shaft having the main gear on the first end of the first shaft, the first shaft having a first groove and a second groove each provided on the second end of the first shaft;
      a second shaft having a first end and a second end, the first end of the second shaft being near the first link and the second end of the second shaft being near the second link, the second shaft having the sub gear on the first end of the second shaft, the second shaft having a first groove on the second end of the second shaft and no additional groove on the second end of the second shaft; and
      a spring that applies biasing force to the main gear and the sub gear in rotational directions different from each other, the spring being connected to the second end of the first shaft and the second end of the second shaft, the spring being a torsional spring having a first end portion and a second end portion, the first end portion extending through the second groove of the first shaft and being connected to the first groove of the second shaft, the second end portion being connected to the first groove of the first shaft,
   wherein the first shaft and the second shaft are arranged in a nested configuration.

2. The robot according to claim 1, wherein
   the first shaft connects the second link on a second end side thereof and is supported by the support part at a position closer to the second end side than a portion on which the main gear is formed, and
   the spring is connected to the first shaft and arranged adjacent to the second link side with respect to the support part.

3. The robot according to claim 1, further comprising:
   an external gear connected to the actuator, wherein
   each of the main gear and the sub gear is an internal gear meshed with the external gear.

4. The robot according to claim 2, further comprising:
   an external gear connected to the actuator, wherein
   each of the main gear and the sub gear is an internal gear meshed with the external gear.

5. The robot according to claim 3, wherein
   the internal gear that constitutes the main gear is formed in the first shaft formed in a cylindrical shape, and
   the support part is arranged inside the first shaft.

6. The robot according to claim 4, wherein
   the internal gear that constitutes the main gear is formed in the first shaft formed in a cylindrical shape, and
   the support part is arranged inside the first shaft.

7. The robot according to claim 1, further comprising:
   a first external gear connected to the actuator, wherein
   each of the main gear and the sub gear is a second external gear meshed with the first external gear.

8. The robot according to claim 2, further comprising:
   a first external gear connected to the actuator, wherein
   each of the main gear and the sub gear is a second external gear meshed with the first external gear.

9. The robot according to claim 7, wherein
   the second external gear that constitutes the main gear is formed in the first shaft formed in a cylindrical shape, and
   the support part is arranged outside the first shaft.

10. The robot according to claim 8, wherein
    the second external gear that constitutes the main gear is formed in the first shaft formed in a cylindrical Shape, and
    the support part is arranged outside the first shaft.

11. The robot according to claim 1, further comprising:
    a wrist having a plurality of links, wherein
    the second link is a distal-end link in the wrist.

12. The robot according to claim 2, further comprising:
    a wrist having a plurality of links, wherein
    the second link is a distal-end link in the wrist.

13. The robot according to claim 1, wherein the second end of the first shaft and the second end of the second shaft overlap with each other along an axial direction of the scissors gear.

14. The robot according to claim 1,
    wherein the first end portion of the spring extends along a radial direction of the scissors gear, and
    wherein the second end portion of the spring extends along the radial direction of the scissors gear.

15. The robot according to claim 1,
    wherein the first end of the first shaft is closer to the first link along an axial direction of the scissors gear than the second end of the first shaft, and the second end of the first shaft is closer to the second link along the axial direction of the scissors gear than the first end of the first shaft, and
    wherein the first end of the second shaft is closer to the first link along the axial direction of the scissors gear than the second end of the second shaft, and the second end of the second shaft is closer to the second link along the axial direction of the scissors gear than the first end of the second shaft.

* * * * *